United States Patent
Wong (10) Patent No.: US 11,016,739 B2
(45) Date of Patent: May 25, 2021

(54) REDUCING MEMORY USAGE IN SOFTWARE APPLICATIONS

(71) Applicant: SAP SE, Walldorf (DE)

(72) Inventor: Johnson Wong, Vancouver (CA)

(73) Assignee: SAP SE, Walldorf (DE)

(*) Notice: Subject to any disclaimer, the term of this patent is extended or adjusted under 35 U.S.C. 154(b) by 22 days.

(21) Appl. No.: 15/847,312

(22) Filed: Dec. 19, 2017

(65) Prior Publication Data

US 2019/0187960 A1 Jun. 20, 2019

(51) Int. Cl.
*G06F 8/30* (2018.01)
*G06F 12/02* (2006.01)
*G06F 8/70* (2018.01)
*G06F 9/455* (2018.01)
*G06F 3/0483* (2013.01)
*H04L 29/08* (2006.01)

(52) U.S. Cl.
CPC ............ *G06F 8/31* (2013.01); *G06F 8/70* (2013.01); *G06F 9/45529* (2013.01); *G06F 12/0253* (2013.01); *G06F 3/0483* (2013.01); *G06F 2212/702* (2013.01); *H04L 67/02* (2013.01)

(58) Field of Classification Search
CPC .......... G06F 8/31; G06F 8/70; G06F 12/0253; G06F 3/0483; G06F 2212/702; G06F 9/45529; H04L 67/02
USPC .......................................................... 717/106
See application file for complete search history.

(56) References Cited

U.S. PATENT DOCUMENTS

| | | | |
|---|---|---|---|
| 7,096,417 B1* | 8/2006 | Bennett | G06F 17/30899 707/E17.119 |
| 7,434,163 B2* | 10/2008 | McKellar | G06F 16/9574 715/234 |
| 10,002,115 B1* | 6/2018 | Killian | G06F 16/9577 |
| 2003/0226106 A1* | 12/2003 | McKellar | G06F 16/9574 715/234 |

(Continued)

OTHER PUBLICATIONS

Ito et al, "A Visual Environment for Dynamic Web Application Composition", [Online], 2003, pp. 184-193, [Retrieved from internet on Jan. 7, 2021], <https://dl.acm.org/doi/pdf/10.1145/900051.900092> (Year: 2003).*

(Continued)

*Primary Examiner* — Geoffrey R St Leger
*Assistant Examiner* — Zengpu Wei
(74) *Attorney, Agent, or Firm* — Fountainhead Law Group P.C.

(57) ABSTRACT

Embodiments of the present disclosure pertain to reducing memory usage in software applications. In one embodiment, the present disclosure includes a computer implemented method comprising constructing a dynamic HTML component in a document object model by executing first source code of a scripting language, generating a static HTML component clone of the dynamic HTML component by executing second source code of the scripting language, replacing the dynamic HTML component with the static HTML component in the document object model by executing third source code of the scripting language, decoupling the dynamic HTML component by executing fourth source code of the scripting language, and deleting the dynamic HTML component from memory using a garbage collection process in a scripting engine.

19 Claims, 7 Drawing Sheets

(56) References Cited

U.S. PATENT DOCUMENTS

| | | | | |
|---|---|---|---|---|
| 2009/0300137 | A1* | 12/2009 | Tyhurst | H04L 67/34 709/217 |
| 2012/0227112 | A1* | 9/2012 | Capasso | G06Q 30/00 726/29 |
| 2012/0324334 | A1* | 12/2012 | Leper | G06F 16/957 715/234 |
| 2013/0339839 | A1* | 12/2013 | Baran | G06F 11/3438 715/234 |
| 2014/0172751 | A1* | 6/2014 | Greenwood | G06Q 40/06 705/36 R |
| 2014/0281904 | A1* | 9/2014 | Burckart | G06F 17/30893 715/234 |
| 2014/0325346 | A1* | 10/2014 | Liu | H04L 61/6013 715/238 |
| 2017/0235829 | A1* | 8/2017 | Han | G06F 17/2247 707/706 |
| 2018/0032627 | A1* | 2/2018 | Margatan | H04L 67/10 |
| 2018/0203674 | A1* | 7/2018 | Dayanandan | G06F 8/38 |

OTHER PUBLICATIONS

Synytskyy et al, "Resolution of Static Clones in Dynamic Web Pages", [Online], 2003, pp. 1-8, [Retrieved from internet on Jan. 7, 2021], <https://ieeexplore.ieee.org/stamp/stamp.jsp?tp=&arnumber=1234008> (Year: 2003).*

Zou et al, "Virtual DOM Coverage for Effective Testing of Dynamic Web Applications", [Online], 2014, pp. 60-70, [Retrieved from internet on Jan. 7, 2021], <https://dl.acm.org/doi/pdf/10.1145/2610384.2610399> (Year: 2014).*

* cited by examiner

REDUCING MEMORY USAGE IN SOFTWARE APPLICATIONS

BACKGROUND

The present disclosure relates to computing, and in particular, to reducing memory usage in software applications.

The ability to create complex visual components in web applications continues to improve, but with it usually comes the increasing cost of memory consumption as the code and data structures used to construct the components become larger and more complex. Accordingly, the construction of complex visual components on a web page can be very expensive from a memory usage perspective.

In JavaScript, for example, memory usage is not something easy to control and can easily overwhelm a device, leading to sluggish performance or even crashing of an application. Due to the nature of JavaScript memory usage and management, proper cleanup of un-used memory becomes difficult. This may be due to several factors. First, cleanup of a piece of memory cannot occur if that memory is being referenced directly or indirectly by another piece of memory that is in use. Additionally, indirect references are generally easy to create even without realizing it, especially through the notion of JavaScript closures. Furthermore, cleanup may be performed automatically by a JavaScript engine and cannot be done manually by the application.

The problems associated with memory consumption may multiply as more components are constructed.

SUMMARY

Embodiments of the present disclosure pertain to reducing memory usage in software applications. In one embodiment, the present disclosure includes a computer implemented method comprising constructing a dynamic HTML component in a document object model by executing first source code of a scripting language, generating a static HTML component clone of the dynamic HTML component by executing second source code of the scripting language, replacing the dynamic HTML component with the static HTML component in the document object model by executing third source code of the scripting language, decoupling the dynamic HTML component by executing fourth source code of the scripting language, and deleting the dynamic HTML component from memory using a garbage collection process in a scripting engine.

The following detailed description and accompanying drawings provide a better understanding of the nature and advantages of the present disclosure.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

Figure 1:
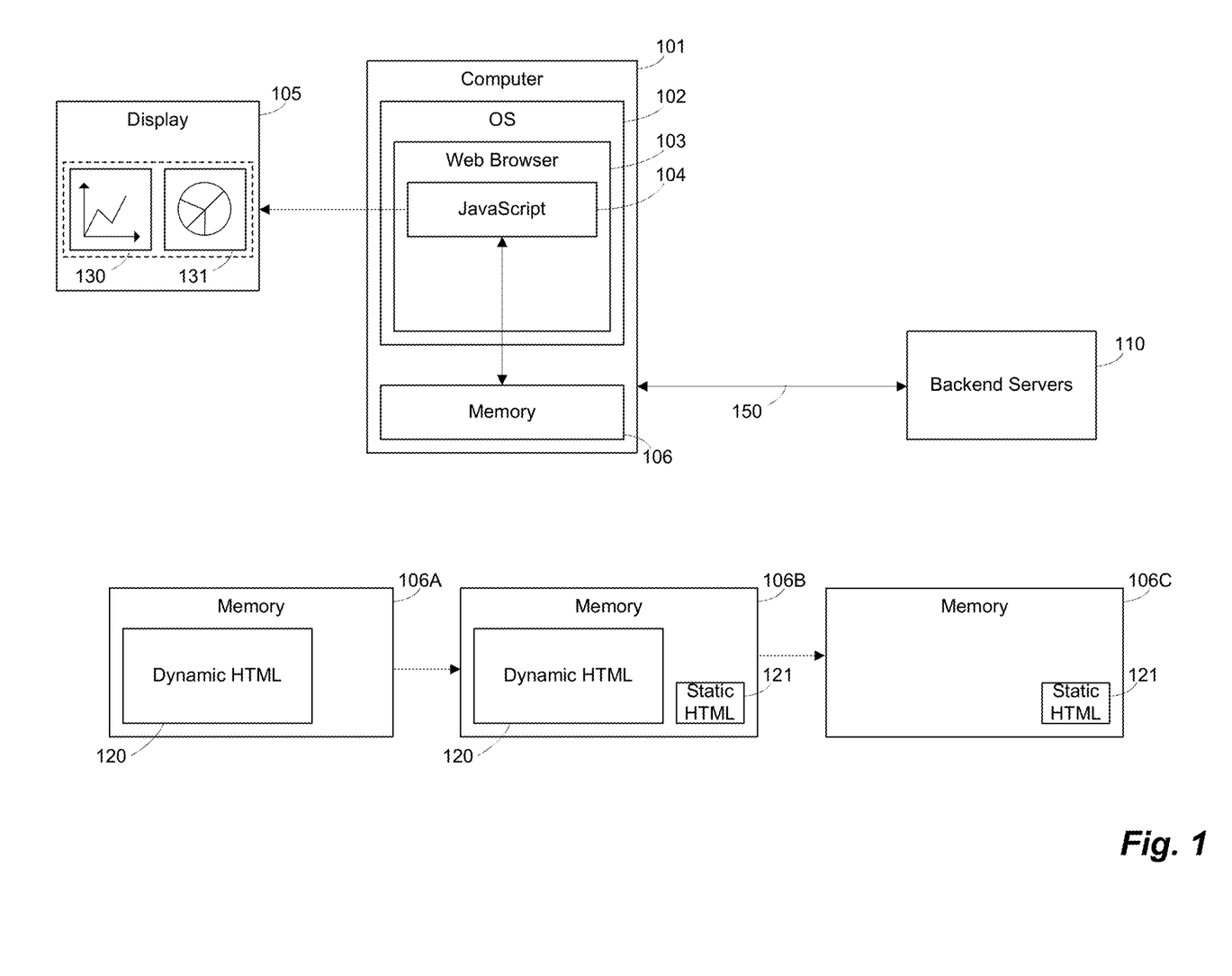
FIG. 1 illustrates reducing memory usage in a web application according to one embodiment.

FIG. 1 illustrates reducing memory usage in a web application according to one embodiment. Features and advantages of the present disclosure include reducing memory usage in applications by swapping dynamic HTML for static HTML. HTML refers to Hypertext Markup Language (HTML), which is a standard markup language for creating web pages and web applications.

As illustrated in FIG. 1, a computer 101 may include an operating system (OS) 102 which may execute a web browser application 103, which may interface with one or more backend servers 110 to provide a wide range of functionality to a user. Web browser application 103 may include JavaScript 104 which, when executed, may cause HTML visual components 130 and 131, for example, to be created and presented to a user in a user interface of a display 105. JavaScript code can run locally (e.g., in a user's browser), and the browser can respond to user actions quickly, making an application more responsive. Furthermore, JavaScript code can detect user actions that HTML alone may not. A JavaScript engine (also known as JavaScript interpreter or JavaScript implementation) is an interpreter that interprets JavaScript source code and executes the script accordingly, for example. While the above example illustrates the techniques disclosed herein in the context of the client computer displaying visual components, it is to be understood that these techniques may be implemented on other computer systems executing scripting languages (e.g., JavaScript), including server computers or databases, for example.

Typically, modern HTML visual components are dynamic HTML. Constructs for the dynamic HTML visual components may be stored in memory 106. Modern applications may include hundreds or thousands of such components to be created during use of an application, which as mentioned above may consume large amounts of memory and impair performance of the system. Features and advantages of the present disclosure include replacing the dynamic HTML visual components with static HTML visual components. For example, in one embodiment, a web application may, during execution, construct a dynamic HTML visual component in a document object model (DOM) by executing first source code of a scripting language. Dynamic HTML (or DHTML), for example, may refer to a combination of three related technologies: HTML, Cascading Style Sheets (CSS), and JavaScript. For example, dynamic HTML may be broad term referring to a combination of technologies used in conjunction to create interactive and animated websites—e.g., a static markup language (e.g., HTML), a client-side scripting language (e.g., JavaScript), a presentation definition language (e.g., CSS), and a Document Object Model (DOM). Dynamic HTML may, for example, allow scripting languages to change variables in a web page's definition language, which in turn affects the look and function of otherwise "static" HTML page content, after the page has been fully loaded and during the viewing process. A dynamic HTML page may still be request/reload-based. With dynamic HTML, there may not be any interaction between the client and server after the page is loaded, for example, and all processing may happen in JavaScript on the client side. As mentioned above, a potential drawback of dynamic HTML is that the associated constructs may consume more memory. A dynamic HTML visualization usage of memory 106A is illustrated at 120 in FIG. 1.

Embodiments of the present disclosure may then generate a static HTML visual component clone of the dynamic HTML visual component by executing second source code of the scripting language. Hypertext Markup Language (HTML) refers to the standard markup language for creating web pages and web applications. Web browsers may receive HTML documents from a web server or from local storage and render them into multimedia web pages. HTML describes the structure of a web page semantically and may include cues for the appearance of the document, for example. HTML elements are the building blocks of HTML pages. With HTML constructs, images and other objects, such as interactive forms, may be embedded into the rendered page. HTML provides a means to create structured documents by denoting structural semantics for text. Static HTML (sometimes called a flat page/stationary page) is a web page that is delivered to the user exactly as stored, in contrast to dynamic HTML mentioned above, which are generated by a web application running a scripting language in a browser, for example. Advantageously, static HTML visualizations consume less memory than dynamic HTML visualizations. This is illustrated in memory 106B showing the memory consumed by a dynamic HTML visual component 120 and a static HTML visual component 121 cloned from the dynamic HTML visual component.

Once a static HTML version of the dynamic HTML is created, the static version may replace the dynamic version. For example, the application may replace the dynamic HTML visual component with the static HTML visual component in the DOM by executing third source code of the scripting language. Next, the dynamic HTML visual component may be decoupled by executing fourth source code of the scripting language, for example. For instance, after the static HTML is coupled to the DOM, the DOM may be updated to no longer reference (decouple) the dynamic HTML. Once the dynamic HTML visual components are decoupled from the DOM, the dynamic HTML visual component may be deleted from memory using a garbage collection process in a scripting engine, for example. The resulting static HTML visual component 121 is illustrated as consuming much less memory 106C in FIG. 1.

Figure 2:
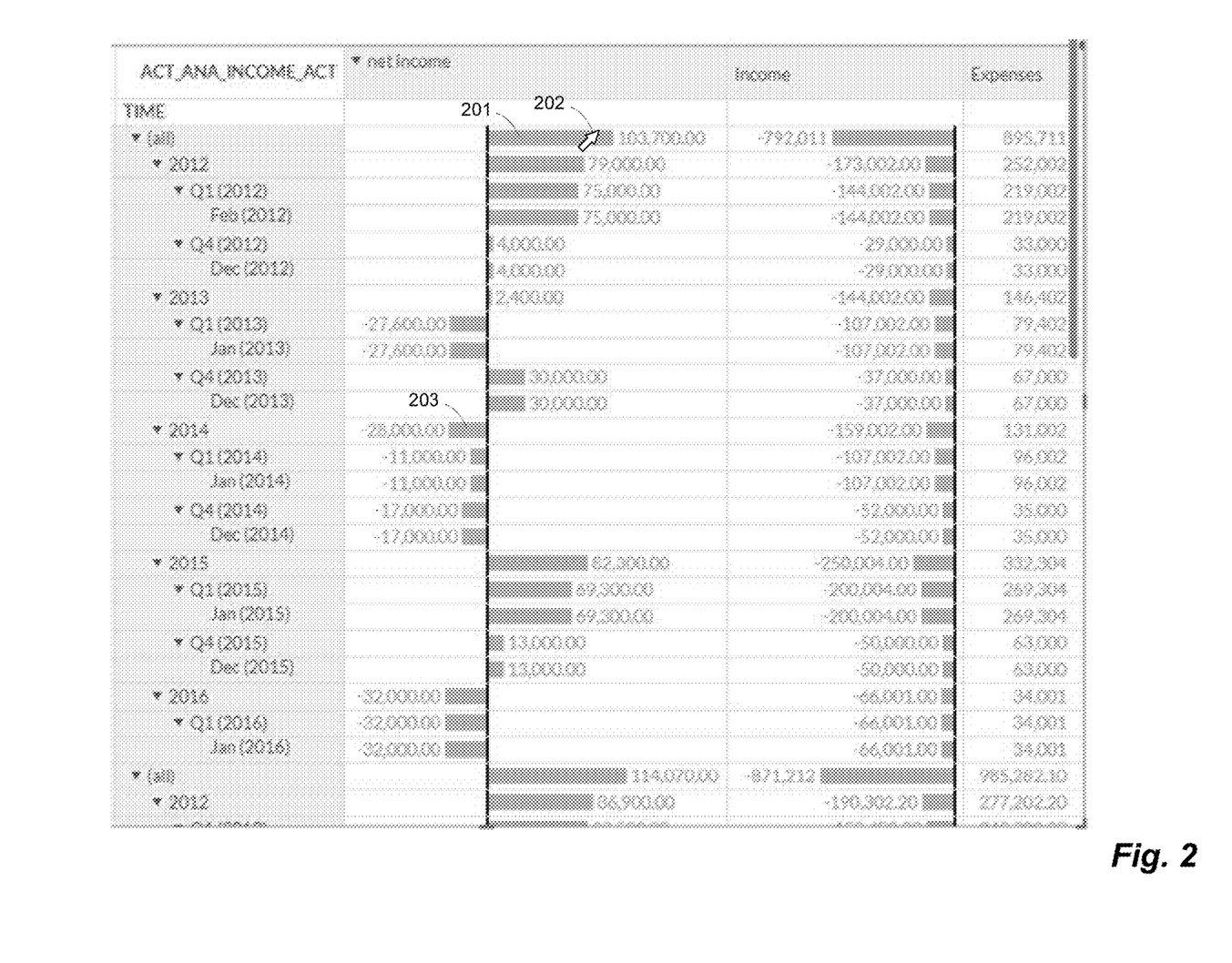
FIG. 2 illustrates visual components according to one embodiment.

FIG. 2 illustrates visual components according to one embodiment. The example shown in FIG. 2 displays a plurality of bar chart visual components. This example involves displaying visualizations within table cells. Here it is very easy for the number of visualizations to increase as it is not uncommon to display many cells in a table. Although the visualizations in this example are not very complex, their memory usage is still non-trivial, and can become very large. Each bar may initially be dynamic HTML which is swapped out for a static HTML clone. For example, bar graph 203 may initially be generated as dynamic HTML, cloned into static HTML, decoupled from the DOM, and replaced with the static version. As illustrated in FIG. 2, the memory savings from all the bar charts being transformed into static HTML may be substantial and result in improved performance of the application.

One limitation of static HTML is that it lacks the ability to be interacted with and change. For example, static HTML cannot bind a mouse click or hover over handler to a static HTML element as that implicitly binds the HTML element with JavaScript logic which raises the original problems associated with uncontrolled memory references. Features and advantages of some embodiments may overcome this limitation by selectively swapping out static HTML with dynamic HTML on demand. For example, if N visualizations need to have attributes of dynamic HTML at any given point in time and there is a total of M visualizations that need to be rendered to the screen at any given point in time, and N is significantly less than M, then it may be desirable to swap in dynamic HTML on-demand, and swap it back out when it is no longer needed.

For example, using the table cell scenario illustrated in FIG. 2, if a user only needs to be able to interact with one cell at a time, the application can dynamically construct a visualization for the cell a user "hovers over" (aka "mouse over") and swap out the static HTML with dynamic HTML when the user hovers over the cell. In one example embodiment, only one dynamic HTML visualization may be in memory at any given point in time, yet the behavior of interacting with visualizations is still preserved.

Thus, in one embodiment, the system may detect a user interaction with a first static HTML visual component, such as a hover over or the like as illustrated by mouse pointer 202 hovering over bar chart 201 in FIG. 2, for example. Next, the system may construct a first dynamic HTML visual component corresponding to the first static HTML visual component, for example. Next, the system may replace the static HTML visual component with the dynamic HTML visual component in the document object model (e.g., on demand). When the user interaction has ended, the system may re-generate the static HTML, replacing the dynamic HTML with the static HTML, and decoupling and deleting the dynamic HTML by repeating the generating, replacing, and decoupling steps to swap dynamic-to-static HTML as described above.

FIGS. 3-8 illustrate memory usage according to an embodiment. Generally, the sequence of operations for creating dynamic HTML and swapping it out for static HTML may be as follows: (1) construct and render visual component as normal (which would create dynamic HTML); (2) create static HTML clone of dynamic HTML; (3) remove dynamic HTML from DOM and swap static HTML in; and (4) cleanup of objects used to construct dynamic HTML. The following pseudo-code illustrates the process to swap out dynamic HTML with static HTML. In some example embodiments, these steps are carried out in sequence to create one or more new visual components without intervening and/or unrelated processing steps:

```
// Step 1
// Invoke API to construct visualization in a container element
const vizInstance=VizAPI.create(container, params);
// Step 2
// Clone rendered dynamic HTML using
// Node.cloneNode( ) API
const staticHTML=container.cloneNode(true);
// Step 3
// Swap out dynamic HTML with static HTML using
// Node.replaceChild( ) API
container.parent.replaceChild(staticHTML, container);
// Step 4
// Invoke API to decouple destroy unneeded JavaScript objects
vizInstance.destroy( );
vizInstance=null;// De-reference visualization object
//Step 5
JavaScript engine garbage collects decoupled constructs
```

As illustrated in Step 5, after the steps 1-4 are performed, and assuming there are no further references to the object(s) used to construct the visualization, the JavaScript engine can now garbage collect both the object(s) and the dynamic HTML, leaving only the static HTML, using typically much less memory.

Figure 3:
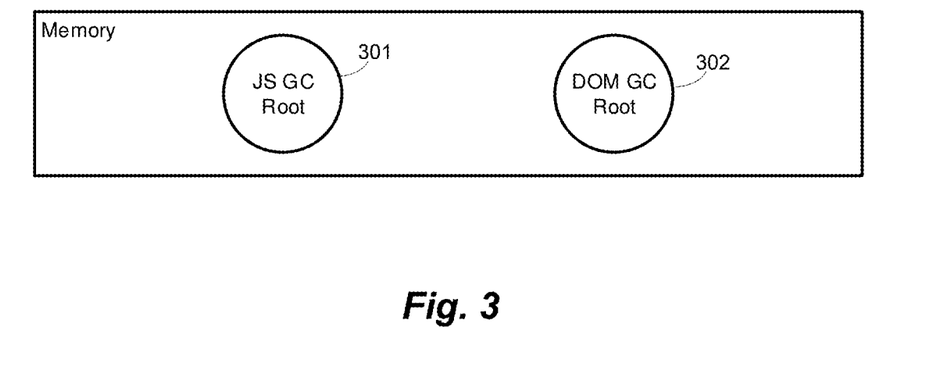
FIGS. 3-8 illustrate memory usage according to an embodiment.

FIGS. 3-8 demonstrate the view of memory at each step with descriptions above. For illustrative purposes, only the relevant parts of memory corresponding to this workflow are shown. Before any operations are performed, the application JavaScript (JS) root node 301 and DOM root node 302, which are used for garbage collection (GC), are not pointing to anything as illustrated in FIG. 3. When objects are created using JavaScript, an object can hold memory in two ways: (1) directly by the object itself or (2) implicitly by holding references to other objects, and therefore preventing those objects from being automatically disposed by a garbage collector. In this example, garbage collector (GC) roots are objects special for garbage collection. A garbage collector engine may collect those objects that are not GC roots and are not accessible by references from GC roots, for example.

Figure 4:
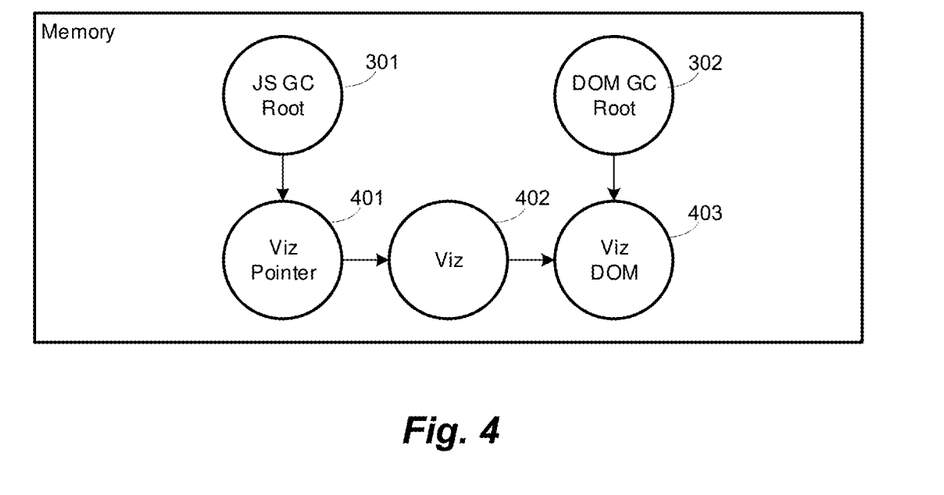

FIG. 4 illustrates the state of memory after step 1, where constructs for a dynamic HTML visual component have been created. In this example, the first source code ("const vizInstance=VizAPI.create(container, params)") invokes a create method. Accordingly, script root node 301 ("JS GC Root") is coupled to a first reference 401 ("Viz Pointer"). Reference 401 points to memory comprising dynamic HTML visual component runtime elements 402 ("Viz") used to construct and show the dynamic HTML visual component. A DOM root node 302 ("DOM GC Root") is coupled to a first DOM reference 403 ("Viz DOM"). DOM reference 403 points to the dynamic HTML visual component, Viz 402, in the document object model (DOM).

The JS GC Root 301 now holds a reference (Viz Pointer) that (e.g., directly and indirectly) holds onto all the memory being used to construct and show a visualization, which includes any additions to the DOM. The DOM GC Root 302 also holds a reference to the newly added DOM objects (Viz DOM aka dynamic HTML) as those objects are rendered onto the DOM.

Figure 5:
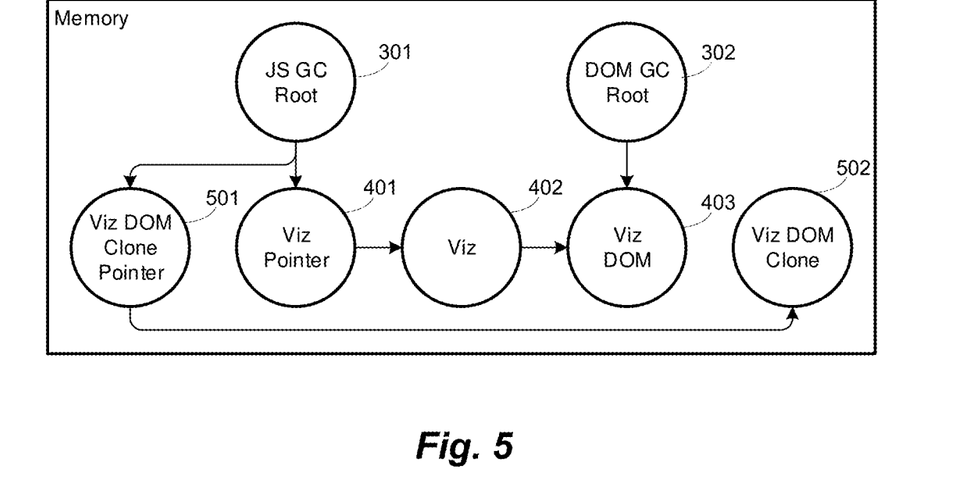

FIG. 5 illustrates the state of memory after step 2. In this example, second source code ("const staticHTML=container.cloneNode(true)") invokes a cloning method to copy the dynamic HTML visual component 402 into the static HTML visual component 502 ("Viz DOM Clone"). Script root node 301 is coupled to a second reference 501 ("Viz DOM Clone Pointer"). Reference 501 points to memory comprising the static HTML visual component 502. The JS GC Root 301 now holds a reference (Viz DOM Clone Pointer) that holds onto memory associated with the cloned dynamic HTML 402 (here, static HTML Viz DOM Clone 502).

Figure 6:
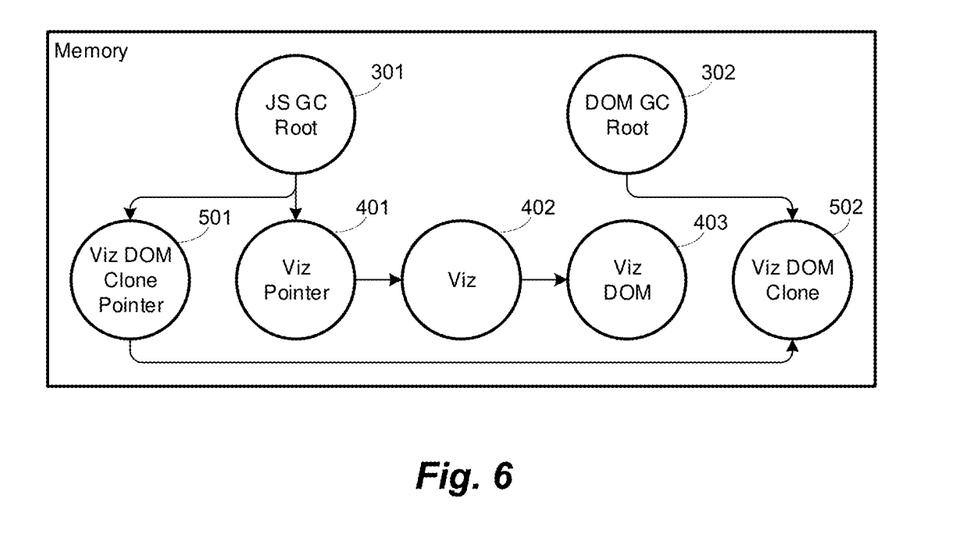

FIG. 6 illustrates the state of memory after step 3. In this example, third source code ("container.parent.replaceChild (staticHTML, container)") invokes a replace method to replace the dynamic HTML visual component 402 with the static HTML visual component 502 in the DOM. DOM root node 302 is decoupled from the dynamic HTML visual component 402 and coupled to the static HTML visual component 502. Accordingly, DOM GC Root 302 has been updated to no longer reference the Viz DOM (dynamic HTML), but instead reference the Viz DOM Clone (static HTML).

Figure 7:
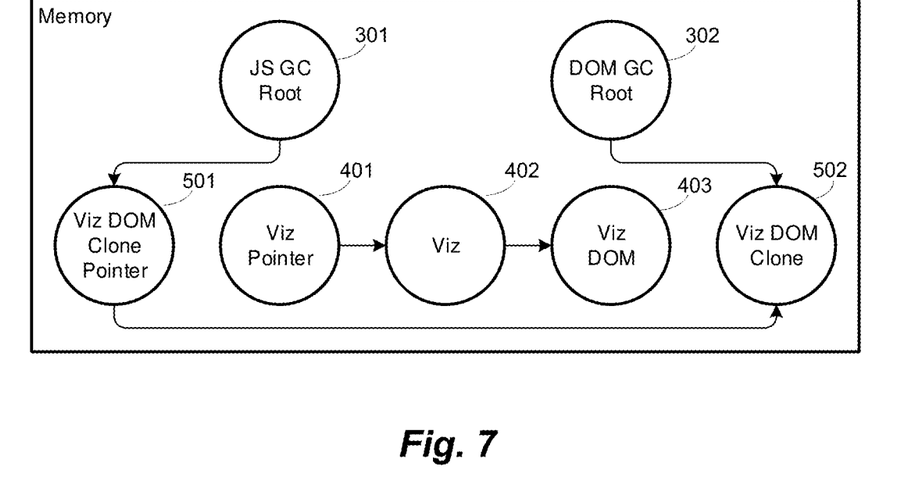
Figure 8:
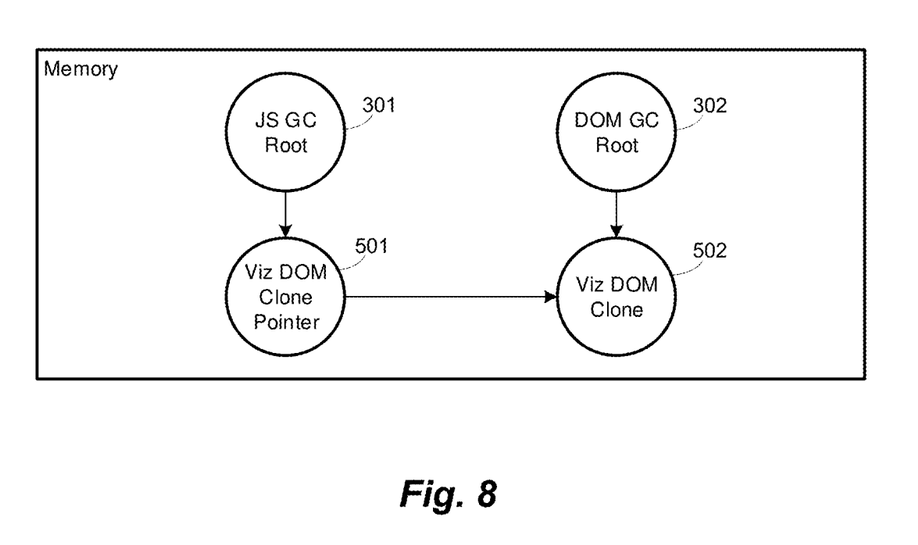

FIG. 7 illustrates the state of memory after step 4. In this example, fourth source code ("vizInstance.destroy( )" and "vizInstance=null") invokes a destroy method, and script root node 301 is decoupled from the first reference 401. Accordingly, the first reference 401, the dynamic HTML visual component runtime elements 402, and the dynamic HTML visual component runtime elements in the document object model 403 are decoupled from all root nodes. Here, all memory associated with the creation of the Viz 402 and Viz DOM 403 is no longer referenced by the JS GC Root 301. For illustrative purposes, this is indicated by "Viz Pointer→Viz→Viz DOM" no longer being connected to any GC Root. As a result of no longer being connected to any GC Root, the "Viz Pointer→Viz→Viz DOM" can now be garbage collected by the engine, leaving only the Viz DOM Clone 502 and its pointer 501, as illustrated in FIG. 8.

The workflow shown in FIGS. 3-8 includes the removal of all the objects, data structures, closures, and other constructs that are used for the Viz DOM (dynamic HTML), collectively shown in the diagrams as "Viz 402". These constructs of dynamic HTML may be the most expensive part of memory usage, and what embodiments of the disclosure may advantageously eliminate. Viz DOM Clone 502 is comparatively light in memory usage, and the pointer 501 has negligible memory usage in this context.

Figure 9:
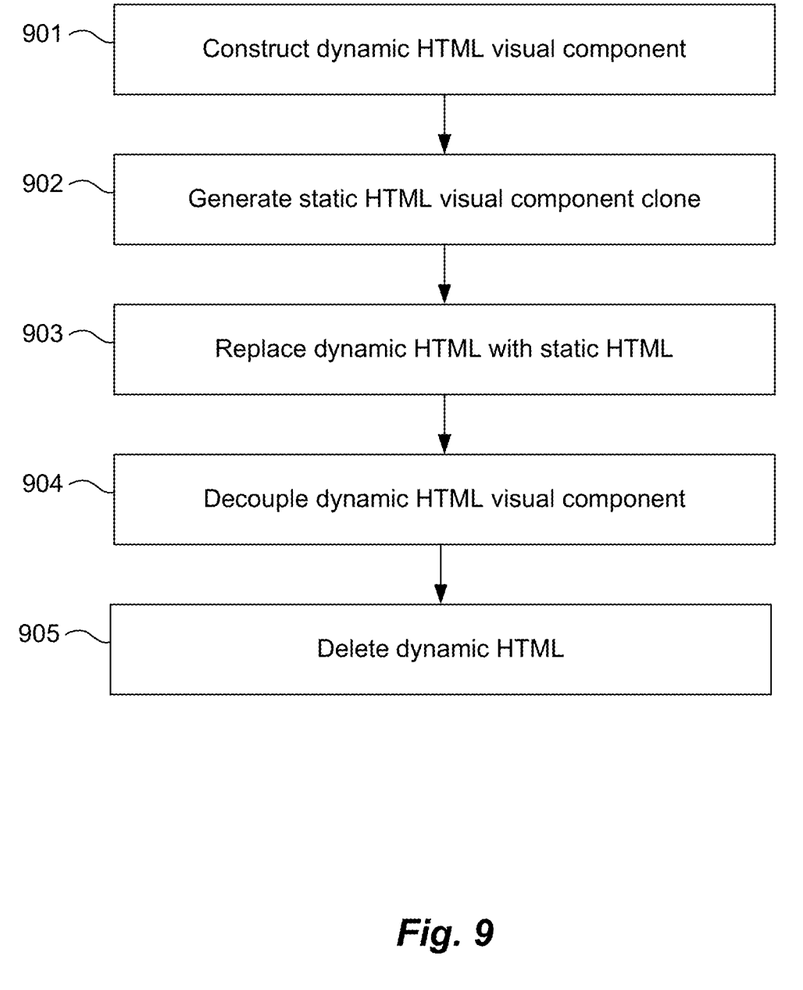
FIG. 9 illustrates a process reducing memory usage according to another embodiment.

FIG. 9 illustrates a process reducing memory usage according to another embodiment. For example, in one embodiment the present disclosure includes a computer implemented method. At 901, a dynamic HTML visual component may be constructed in a document object model by executing first source code of a scripting language. At 902, a static HTML visual component clone of the dynamic HTML visual component may be generated by executing second source code of the scripting language. At 903, the dynamic HTML visual component may be replaced with the static HTML visual component in the document object model by executing third source code of the scripting language. At 904, the dynamic HTML visual component may be decoupled by executing fourth source code of the scripting language. At 905, the dynamic HTML visual component may be deleted from memory using a garbage collection process in a scripting engine. In one embodiment, the constructing, generating, replacing, and decoupling steps mentioned above are performed before any additional references are made to the dynamic HTML visual component, for example. In some embodiments, the scripting language may be JavaScript. In some embodiments, the method may be performed by a web browser, for example.

Figure 10:
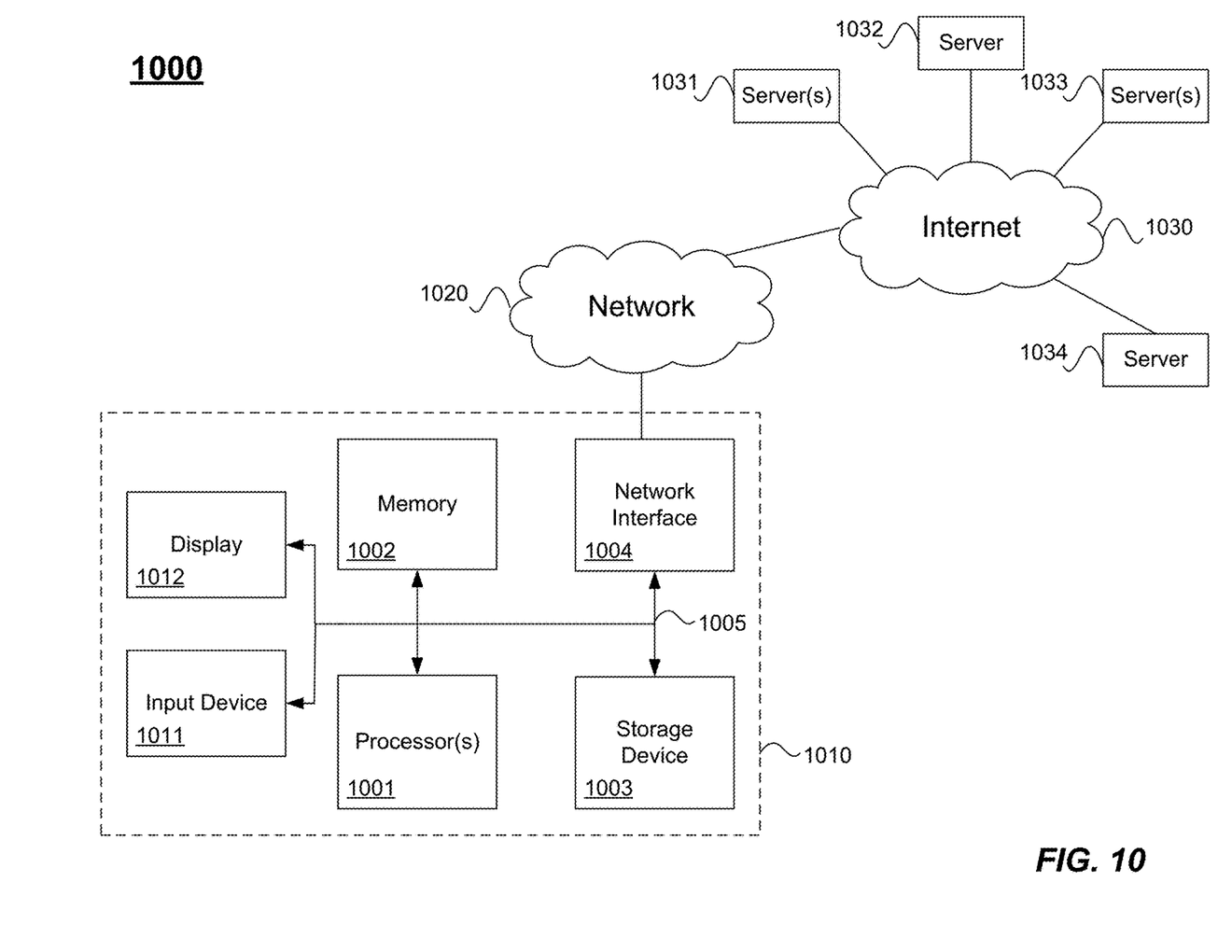
FIG. 10 illustrates hardware of a special purpose computing machine configured according to the above disclosure.

FIG. 10 illustrates hardware of a special purpose computing machine configured according to the above disclosure. The following hardware description is merely one example. It is to be understood that a variety of computers topologies may be used to implement the above described techniques. An example computer system 1010 is illustrated in FIG. 10. Computer system 1010 includes a bus 1005 or other communication mechanism for communicating information, and one or more processor(s) 1001 coupled with bus 1005 for processing information. Computer system 1010 also includes a memory 1002 coupled to bus 1005 for storing information and instructions to be executed by processor 1001, including information and instructions for performing some of the techniques described above, for example. Memory 1002 may also be used for storing programs executed by processor(s) 1001. Possible implementations of memory 1002 may be, but are not limited to, random access memory (RAM), read only memory (ROM), or both. A storage device 1003 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 1003 may include source code, binary code, or software files for performing the techniques above, for example. Storage device 1003 and memory 1002 are both examples of non-transitory computer readable storage mediums.

Computer system 1010 may be coupled via bus 1005 to a display 1012 for displaying information to a computer user. An input device 1011 such as a keyboard, touchscreen, and/or mouse is coupled to bus 1005 for communicating information and command selections from the user to processor 1001. The combination of these components allows the user to communicate with the system. In some systems, bus 1005 represents multiple specialized buses for coupling various components of the computer together, for example.

Computer system 1010 also includes a network interface 1004 coupled with bus 1005. Network interface 1004 may provide two-way data communication between computer system 1010 and a local network 1020. Network 1020 may represent one or multiple networking technologies, such as Ethernet, local wireless networks (e.g., WiFi), or cellular networks, for example. The network interface 1004 may be a wireless or wired connection, for example. Computer system 1010 can send and receive information through the network interface 1004 across a wired or wireless local area network, an Intranet, or a cellular network to the Internet 1030, for example. In some embodiments, a browser, for example, may access data and features on backend software systems that may reside on multiple different hardware servers on-prem 1031 or across the Internet 1030 on servers 1032-1035. One or more of servers 1032-1035 may also reside in a cloud computing environment, for example.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A computer implemented method comprising:
   constructing, by a web browser executing on a computer and interfacing with one or more backend servers, a dynamic HTML visual component in a document object model by executing first source code of a scripting language, wherein a script root node is coupled to a first reference, the first reference pointing to memory comprising dynamic HTML visual component runtime elements used to construct and show the dynamic HTML visual component;
   generating, by the web browser, a static HTML visual component clone of the dynamic HTML visual component by executing second source code of the scripting language, wherein the script root node is coupled to a second reference, the second reference pointing to memory comprising the static HTML visual component;
   replacing, within the document object model by the web browser, the dynamic HTML visual component with the static HTML visual component by executing third source code of the scripting language, said replacing causes the document object model to reference the static HTML visual component to enable the static HTML visual component to be shown, wherein the third source code implements a replace child function on the document object model to perform said replacing;
   decoupling, within the document object model by the web browser, the dynamic HTML visual component by executing fourth source code of the scripting language, said decoupling causes the document object model to no longer reference the dynamic HTML visual component; and
   deleting, on the computer, the dynamic HTML visual component from memory using a garbage collection process in a scripting engine, wherein the application is enabled to revert to the dynamic HTML visual component in response to user interaction with the static HTML visual component;
   wherein after the second source code is executed and before the fourth source code is executed, the script root node is concurrently coupled to the first DOM reference pointing to the dynamic HTML visual component and to the second reference pointing to the static HTML visual component.

2. The method of claim 1 wherein said constructing, generating, replacing, and decoupling steps are performed before any additional references are made to the dynamic HTML visual component.

3. The method of claim 1 wherein the first source code, the second source code, the third source code, and the fourth source code are each included by the web browser.

4. The method of claim 1 wherein the first source code invokes a create method, and wherein a DOM root node is coupled to a first DOM reference, the first DOM reference pointing to the dynamic HTML visual component in the document object model.

5. The method of claim 4 wherein the second source code invokes a cloning method to copy the dynamic HTML visual component into the static HTML visual component.

6. The method of claim 5 wherein the third source code invokes a replace method to replace the dynamic HTML visual component with the static HTML visual component in the document object model, and wherein the DOM root node is decoupled from the dynamic HTML visual component and coupled to the static HTML visual component.

7. The method of claim 6 wherein the fourth source code invokes a destroy method, and wherein the script root node is decoupled from the first reference, and wherein the first reference, the dynamic HTML visual component runtime elements, and the dynamic HTML visual component runtime elements in the document object model are decoupled from all root nodes.

8. The method of claim 1 further comprising:
   detecting a user interaction with a first static HTML visual component;
   constructing a first dynamic HTML visual component corresponding to the first static HTML visual component;
   replacing the static HTML visual component with the dynamic HTML visual component in the document object model; and
   repeating said generating, replacing, and decoupling steps of claim 1 when the user interaction has ended.

9. The method of claim 8 wherein only one dynamic HTML visual component is in memory at any point in time.

10. The method of claim 8 wherein the user interaction is a hover over.

11. A non-transitory machine-readable medium storing a program executable by at least one processing unit of a computer executing a web browser that interfaces with one or more backend servers, the program comprising sets of instructions for:

constructing, by the web browser executing on the computer, a dynamic HTML component in a document object model by executing first source code of a scripting language; wherein a script root node is coupled to a first reference, the first reference pointing to memory comprising dynamic HTML visual component runtime elements used to construct and show the dynamic HTML visual component;

generating, by the web browser, a static HTML component clone of the dynamic HTML component by executing second source code of the scripting language, wherein the script root node is coupled to a second reference, the second reference pointing to memory comprising the static HTML visual component;

replacing, within the document object model by the web browser, the dynamic HTML component with the static HTML component by executing third source code of the scripting language, said replacing causes the document object model to reference the static HTML component to enable the static HTML component to be shown;

decoupling, within the document object model by the web browser, the dynamic HTML component by executing fourth source code of the scripting language, said decoupling causes the document object model to no longer reference the dynamic HTML visual component; and deleting, on the computer, the dynamic HTML component from memory using a garbage collection process in a scripting engine, wherein the application is enabled to revert to the dynamic HTML component in response to user interaction with the static HTML component;

wherein after the second source code is executed and before the fourth source code is executed, the script root node is concurrently coupled to the first DOM reference pointing to the dynamic HTML visual component and to the second reference pointing to the static HTML visual component.

12. The non-transitory machine-readable medium of claim 11 wherein said constructing, generating, replacing, and decoupling steps are performed before any additional references are made to the dynamic HTML visual component.

13. The non-transitory machine-readable medium of claim 11 wherein the first source code, the second source code, the third source code, and the fourth source code are each included by the web browser.

14. The non-transitory machine-readable medium of claim 13, the program further comprising sets of instructions for:

detecting a user interaction with a first static HTML visual component;

constructing a first dynamic HTML visual component corresponding to the first static HTML visual component;

replacing the static HTML visual component with the dynamic HTML visual component in the document object model; and repeating said generating, replacing, and decoupling steps of claim 11 when the user interaction has ended.

15. The non-transitory machine-readable medium of claim 11 wherein the first source code invokes a create method, and wherein a DOM root node is coupled to a first DOM reference, the first DOM reference pointing to the dynamic HTML visual component in the document object model.

16. A computer executing a web browser that interfaces with one or more backend servers, the computer comprising:

a processor;

a memory; and non-transitory machine-readable medium storing a program executable by the processor, the program comprising sets of instructions for:

constructing, by the web browser, a dynamic HTML visual component in a document object model by executing first source code of a scripting language, wherein a script root node is coupled to a first reference, the first reference pointing to memory comprising dynamic HTML visual component runtime elements used to construct and show the dynamic HTML visual component;

generating, by the web browser, a static HTML visual component clone of the dynamic HTML visual component by executing second source code of the scripting language, wherein the script root node is coupled to a second reference, the second reference pointing to memory comprising the static HTML visual component;

replacing, within the document object model by the web browser, the dynamic HTML visual component with the static HTML visual component in the document object model by executing third source code of the scripting language, said replacing causes the document object model to reference the static HTML visual component to enable the static HTML visual component to be shown, wherein the third source code implements a replace child function on the document object model to perform said replacing;

decoupling, within the document object model by the web browser, the dynamic HTML visual component by executing fourth source code of the scripting language, said decoupling causes the document object model to no longer reference the dynamic HTML visual component; and deleting, on the computer, the dynamic HTML visual component from memory using a garbage collection process in a scripting engine, wherein the application is enabled to revert to the dynamic HTML visual component in response to user interaction with the static HTML visual component;

wherein after the second source code is executed and before the fourth source code is executed, the script root node is concurrently coupled to the first DOM reference pointing to the dynamic HTML visual component and to the second reference pointing to the static HTML visual component.

17. The computer system of claim 16 wherein first source code, the second source code, the third source code, and the fourth source code are each included by the web browser.

18. The computer system of claim 16 further comprising:

detecting a user interaction with a first static HTML component;

constructing a first dynamic HTML visual component corresponding to the first static HTML component;

replacing the static HTML visual component with the dynamic HTML visual component in the document object model; and repeating said generating, replacing, and decoupling steps of claim 16 when the user interaction has ended.

19. The computer system of claim 16 wherein the first source code invokes a create method, and wherein a script root node is coupled to a first reference, the first reference pointing to memory comprising dynamic HTML visual component runtime elements used to construct and show the dynamic HTML visual component, and wherein a DOM root node is coupled to a first DOM reference, the first DOM reference pointing to the dynamic HTML visual component in the document object model.

* * * * *